US010229346B1

(12) United States Patent
Kim et al.

(10) Patent No.: US 10,229,346 B1
(45) Date of Patent: Mar. 12, 2019

(54) LEARNING METHOD, LEARNING DEVICE FOR DETECTING OBJECT USING EDGE IMAGE AND TESTING METHOD, TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/120,664

(22) Filed: Sep. 4, 2018

(51) Int. Cl.
*G06K 9/00* (2006.01)
*G06K 9/46* (2006.01)
(Continued)

(52) U.S. Cl.
CPC ....... *G06K 9/6262* (2013.01); *G06K 9/00798* (2013.01); *G06K 9/4604* (2013.01);
(Continued)

(58) Field of Classification Search
CPC .. G06N 3/08; G06N 3/02; G06K 9/66; G06K 9/6256; G06K 9/4604; G06K 9/00288;
(Continued)

(56) References Cited

U.S. PATENT DOCUMENTS

2016/0239706 A1* 8/2016 Dijkman ............. G06F 17/3028
2018/0285659 A1* 10/2018 Kwant ............... G06K 9/00798

OTHER PUBLICATIONS

Bailo, Oleksandr, et al. "Robust road marking detection and recognition using density-based grouping and machine learning techniques." Applications of Computer Vision (WACV), 2017 IEEE Winter Conference on. IEEE, 2017. (Year: 2017).*
(Continued)

*Primary Examiner* — Vincent Rudolph
*Assistant Examiner* — Raphael Schwartz
(74) *Attorney, Agent, or Firm* — Xsensus LLP

(57) ABSTRACT

A learning method for detecting a specific object based on convolutional neural network (CNN) is provided. The learning method includes steps of: (a) a learning device, if an input image is obtained, performing (i) a process of applying one or more convolution operations to the input image to thereby obtain at least one specific feature map and (ii) a process of obtaining an edge image by extracting at least one edge part from the input image, and obtaining at least one guide map including information on at least one specific edge part having a specific shape similar to that of the specific object from the obtained edge image; and (b) the learning device reflecting the guide map on the specific feature map to thereby obtain a segmentation result for detecting the specific object in the input image.

28 Claims, 8 Drawing Sheets

(51) Int. Cl.
*G06K 9/62* (2006.01)
*G06T 7/12* (2017.01)

(52) U.S. Cl.
CPC .............. *G06K 9/4647* (2013.01); *G06T 7/12* (2017.01); *G06T 2207/20081* (2013.01); *G06T 2207/20084* (2013.01); *G06T 2207/30256* (2013.01)

(58) Field of Classification Search
CPC .... G06K 9/00744; G06K 9/46; G06K 9/6267; G06T 2207/20081; G06T 2207/20084; G06T 3/4046
See application file for complete search history.

(56) References Cited

OTHER PUBLICATIONS

Kim, Jihun, and Minho Lee. "Robust lane detection based on convolutional neural network and random sample consensus." International Conference on Neural Information Processing. Springer, Cham, 2014. (Year: 2014).*

\* cited by examiner

FIG. 6
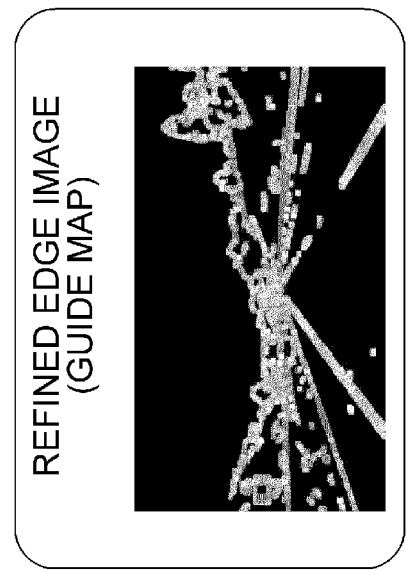
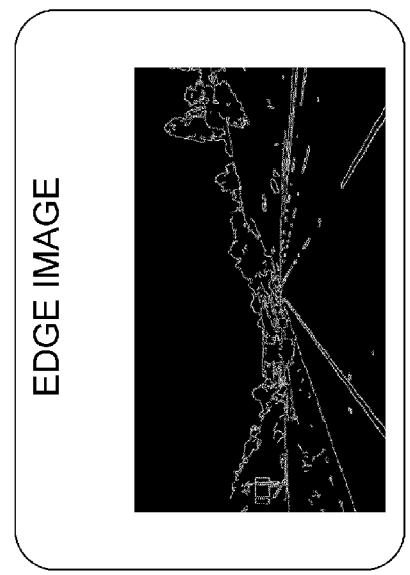

FIG. 7
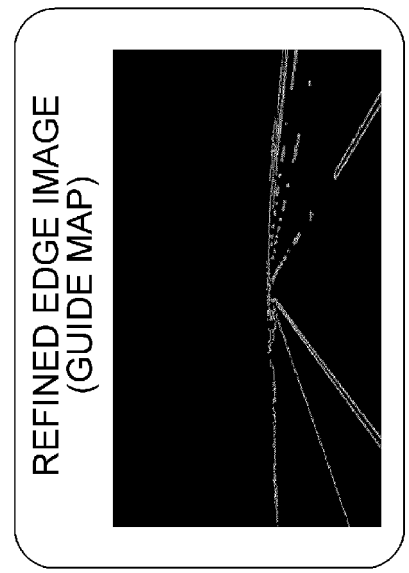
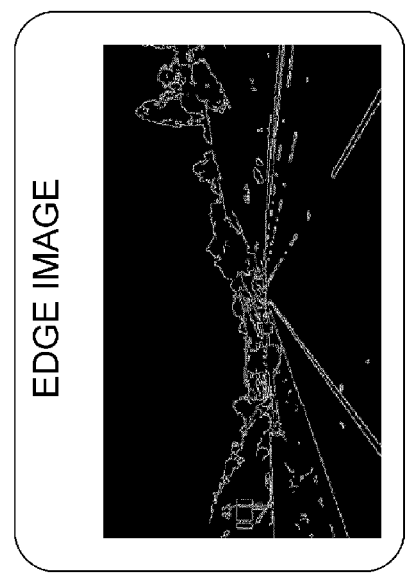

LEARNING METHOD, LEARNING DEVICE FOR DETECTING OBJECT USING EDGE IMAGE AND TESTING METHOD, TESTING DEVICE USING THE SAME

FIELD OF THE INVENTION

The present invention relates to a learning method and a learning device for detecting an object based on convolutional neural network (CNN), and a testing method and a testing device using the same; and more particularly, to the learning method for detecting a specific object based on convolutional neural network (CNN), including steps of: (a) the learning device, if an input image is obtained, performing (i) a process of applying one or more convolution operations to the input image to thereby obtain at least one specific feature map and (ii) a process of obtaining an edge image by extracting at least one edge part from the input image, and obtaining at least one guide map including information on at least one specific edge part having a specific shape similar to that of the specific object from the obtained edge image; and (b) the learning device reflecting the guide map on the specific feature map to thereby obtain a segmentation result for detecting the specific object in the input image, and the learning device, the testing method and the testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs, won the 2012 ImageNet image classification tournament, crushing other competitors. Then, the convolution neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

FIG. 2 is a simplified drawing of a conventional lane detection method using a CNN, and FIG. 3 is a simplified drawing of a general CNN segmentation process.

First of all, by referring to FIG. 3, according to the conventional lane detection method, a learning device receives an input image, acquires feature maps by multiple convolution operations and non-linear operations like ReLU in multiple convolutional layers, and acquires a segmentation result by performing multiple deconvolution operations in multiple deconvolutional layers and SoftMax operations on a last of the feature maps.

Also, by referring to FIG. 2, the segmentation result of the conventional lane detection method is composed of two elements, i.e., lanes and backgrounds, as shown in the middle of FIG. 2. The segmentation result is expressed as probability estimation. The lanes are found by sampling pixels with high probabilities of being on any lane from candidate pixels selected as such, and then the lanes are finally determined by using a lane modeling function acquired from pixels on the found lanes.

However, a conventional CNN device for detecting one or more specific objects such as lanes should classify various background parts as one class (i.e., a class in which label=0), but it is difficult to accurately detect the specific object because of a large in-class variation (the variation of detected values within the same class) in the background parts. For example, when detecting one or more lanes, the background parts other than the lanes in an input image include various shapes such as a sign, a building and the like. However, since there are some background parts having a shape similar to that of a lane, the label value in the background class is not close to 0 and the variation of the label value in the background class becomes large. Namely, if an object belonging to a background part has a shape similar to that of a lane, the label value becomes close to neither the lane (label=1) nor the background (label=0), which makes lane detection difficult.

SUMMARY OF THE INVENTION

It is an object of the present invention to solve all the aforementioned problems.

It is another object of the present invention to provide a method for easily detecting a specific object by exempting other objects, belonging to one of backgrounds, similar to the specific object from subjects of detection.

It is still another object of the present invention to provide a method for accurately detecting the specific object within an image by using at least one edge image as well as at least one specific feature map obtained through convolutional neural network (CNN).

In accordance with one aspect of the present invention, there is provided a learning method for detecting a specific object based on convolutional neural network (CNN), including steps of: (a) a learning device, if an input image is obtained, performing (i) a process of applying one or more convolution operations to the input image to thereby obtain at least one specific feature map and (ii) a process of obtaining an edge image by extracting at least one edge part from the input image, and obtaining at least one guide map including information on at least one specific edge part having a specific shape similar to that of the specific object from the obtained edge image; and (b) the learning device reflecting the guide map on the specific feature map to thereby obtain a segmentation result for detecting the specific object in the input image.

As one example, the edge image is obtained by removing frequency components equal to or less than a specific threshold from the input image.

As one example, the edge image is a canny edge image which is generated, after calculating gradients of pixels of the input image, by extracting at least one pixel having a gradient equal to or greater than a predetermined threshold among the pixels of the input image.

As one example, the guide map is obtained by giving a first weight to the specific shape similar to that of the specific object and giving a second weight to at least one shape other than the specific shape similar to that of the specific object, wherein the first weight is greater than the second weight.

As one example, the guide map is generated by widening the specific edge part by applying at least one dilation or morphological operation to the edge image.

As one example, at the step of (b), the learning device performs pixel-wise multiplication between the guide map and the specific feature map to thereby generate at least one edge-reinforced feature map.

As one example the step of (b) includes steps of: (b1) the learning device, on condition that there are a plurality of the specific feature maps, resizing the guide map to generate one or more resized guide maps such that a size of each of the resized guide maps corresponds to that of each of the specific feature maps; and (b2) the learning device performing the pixel-wise multiplication between the guide map and its corresponding specific feature map and performing the pixel-wise multiplication between the resized guide maps and their corresponding specific feature maps, to thereby generate the plurality of edge-reinforced feature maps.

As one example, at the step of (b), the specific feature map on which the guide map is reflected is selected among at least one feature map obtained from an encoding layer of the learning device and at least one feature map obtained from a decoding layer of the learning device.

As one example, the specific object is at least one lane on a road.

As one example, the learning method further includes steps of: (c) the learning device calculating a segmentation loss by referring to the segmentation result and its corresponding ground truth (GT); and (d) the learning device performing backpropagation by using the segmentation loss to thereby optimize at least one parameter of the learning device.

In accordance with another aspect of the present invention, there is provided a testing method for detecting at least one specific object included in a convolutional neural network (CNN)-based image, including steps of: (a) on condition that, (i) a learning device has applied one or more convolution operations to a training image to thereby obtain at least one specific feature map for training; (ii) the learning device has obtained an edge image for training by extracting at least one edge part from the training image, and has obtained at least one guide map for training including information on a specific edge part for training having a specific shape similar to that of the specific object from the obtained edge image for training; (iii) the learning device has reflected the guide map for training on the specific feature map for training to thereby obtain a segmentation result for training for detecting the specific object in the training image; (iv) the learning device has calculated a segmentation loss by referring to the detected segmentation result for training and its corresponding ground truth (GT); and (v) the learning device has performed backpropagation by using the segmentation loss to thereby optimize at least one parameter of the learning device, a testing device obtaining a test image; (b) the testing device performing (i) a process of applying one or more convolution operations to the test image to thereby obtain at least one specific feature map for testing and (ii) a process of obtaining an edge image for testing by extracting at least one edge part from the test image, and obtaining at least one guide map for testing including information on at least one specific edge part for testing having a specific shape similar to that of the specific object from the obtained edge image for testing; and (c) the testing device reflecting the guide map for testing on the specific feature map for testing to thereby obtain a segmentation result for testing for detecting the specific object in the test image.

As one example, the edge image for testing is obtained by removing frequency components equal to or less than a specific threshold from the test image.

As one example, the edge image for testing is a canny edge image which is generated, after calculating gradients of pixels of the test image, by extracting at least one pixel having a gradient equal to or greater than a predetermined threshold among the pixels of the test image.

As one example, the guide map for testing is obtained by giving a first weight to the specific shape similar to that of the specific object and giving a second weight to at least one shape other than the specific shape similar to that of the specific object, wherein the first weight is greater than the second weight, and wherein the guide map for testing is generated by widening the specific edge part for testing by applying at least one dilation or morphological operation to the edge image for testing.

As one example, the step of (c) includes steps of: (c1) the testing device, on condition that there are a plurality of the specific feature maps for testing, resizing the guide map for testing to generate one or more resized guide maps for testing such that a size of each of the resized guide maps for testing corresponds to that of each of the specific feature maps for testing; and (c2) the testing device performing the pixel-wise multiplication between the guide map for testing and its corresponding specific feature map for testing and performing the pixel-wise multiplication between the resized guide maps for testing and their corresponding specific feature maps for testing, to thereby generate the plurality of edge-reinforced feature maps for testing.

In accordance with still another aspect of the present invention, there is provided a learning device for detecting a specific object based on convolutional neural network (CNN), comprising: a communication part for acquiring an input image as a training image; and a processor for performing processes of (I) applying one or more convolution operations to the input image to thereby obtain at least one specific feature map; (II) obtaining an edge image by extracting at least one edge part from the input image, and obtaining at least one guide map including information on at least one specific edge part having a specific shape similar to that of the specific object from the obtained edge image; and (III) reflecting the guide map on the specific feature map to thereby obtain a segmentation result for detecting the specific object in the input image.

As one example, the edge image is obtained by removing frequency components equal to or less than a specific threshold from the input image.

As one example, the edge image is a canny edge image which is generated, after calculating gradients of pixels of the input image, by extracting at least one pixel having a gradient equal to or greater than a predetermined threshold among the pixels of the input image.

As one example, the guide map is obtained by giving a first weight to the specific shape similar to that of the specific object and giving a second weight to at least one shape other than the specific shape similar to that of the specific object, wherein the first weight is greater than the second weight.

As one example, the guide map is generated by widening the specific edge part by applying at least one dilation or morphological operation to the edge image.

As one example, at the process of (III), the processor performs pixel-wise multiplication between the guide map and the specific feature map to thereby generate at least one edge-reinforced feature map.

As one example, the process of (III) includes processes of: (III-1) on condition that there are a plurality of the specific feature maps, resizing the guide map to generate one or more resized guide maps such that a size of each of the resized guide maps corresponds to that of each of the specific feature maps; and (III-2) performing the pixel-wise multiplication between the guide map and its corresponding specific feature map and performing the pixel-wise multiplication between the resized guide maps and their corresponding specific feature maps, to thereby generate the plurality of edge-reinforced feature maps.

As one example, at the process of (III), the specific feature map on which the guide map is reflected is selected among at least one feature map obtained from an encoding layer thereof and at least one feature map obtained from a decoding layer thereof.

As one example, the specific object is at least one lane on a road.

As one example, the processor further performs processes of: (IV) calculating a segmentation loss by referring to the segmentation result and its corresponding ground truth (GT); and (V) performing backpropagation by using the segmentation loss to thereby optimize at least one parameter thereof.

In accordance with still yet another aspect of the present invention, there is provided a testing device for detecting at least one specific object included in a convolutional neural network (CNN)-based image, comprising: a communication part for obtaining a test image on condition that, (i) a learning device has applied one or more convolution operations to a training image to thereby obtain at least one specific feature map for training; (ii) the learning device has obtained an edge image for training by extracting at least one edge part from the training image, and has obtained at least one guide map for training including information on a specific edge part for training having a specific shape similar to that of a specific object from the obtained edge image for training; (iii) the learning device has reflected the guide map for training on the specific feature map for training to thereby obtain a segmentation result for training for detecting the specific object in the training image; (iv) the learning device has calculated a segmentation loss by referring to the detected segmentation result for training and its corresponding ground truth (GT); and (v) the learning device has performed backpropagation by using the segmentation loss to thereby optimize at least one parameter of the learning device; and a processor for performing processes of (I) applying one or more convolution operations to the test image to thereby obtain at least one specific feature map for testing, and obtaining an edge image for testing by extracting at least one edge part from the test image, and obtaining at least one guide map for testing including information on at least one specific edge part for testing having a specific shape similar to that of the specific object from the obtained edge image for testing; and (II) reflecting the guide map for testing on the specific feature map for testing to thereby obtain a segmentation result for testing for detecting the specific object in the test image.

As one example, the edge image for testing is obtained by removing frequency components equal to or less than a specific threshold from the test image.

As one example, the edge image for testing is a canny edge image which is generated, after calculating gradients of pixels of the test image, by extracting at least one pixel having a gradient equal to or greater than a predetermined threshold among the pixels of the test image.

As one example, the guide map for testing is obtained by giving a first weight to the specific shape similar to that of the specific object and giving a second weight to at least one shape other than the specific shape similar to that of the specific object, wherein the first weight is greater than the second weight, and wherein the guide map for testing is generated by widening the specific edge part for testing by applying at least one dilation or morphological operation to the edge image for testing.

As one example, the process of (II) includes processes of: (II_1) on condition that there are a plurality of the specific feature maps for testing, resizing the guide map for testing to generate one or more resized guide maps for testing such that a size of each of the resized guide maps for testing corresponds to that of each of the specific feature maps for testing; and (II_2) performing the pixel-wise multiplication between the guide map for testing and its corresponding specific feature map for testing and performing the pixel-wise multiplication between the resized guide maps for testing and their corresponding specific feature maps for testing, to thereby generate the plurality of edge-reinforced feature maps for testing.

BRIEF DESCRIPTION OF THE DRAWINGS

The above and other objects and features of the present invention will become apparent from the following description of preferred embodiments given in conjunction with the accompanying drawings, in which:

FIG. 6 illustrates an example of a process of generating a guide map.

FIG. 7 illustrates another example of a process of generating a guide map.

DETAILED DESCRIPTION OF THE PREFERRED EMBODIMENTS

Figure 1:
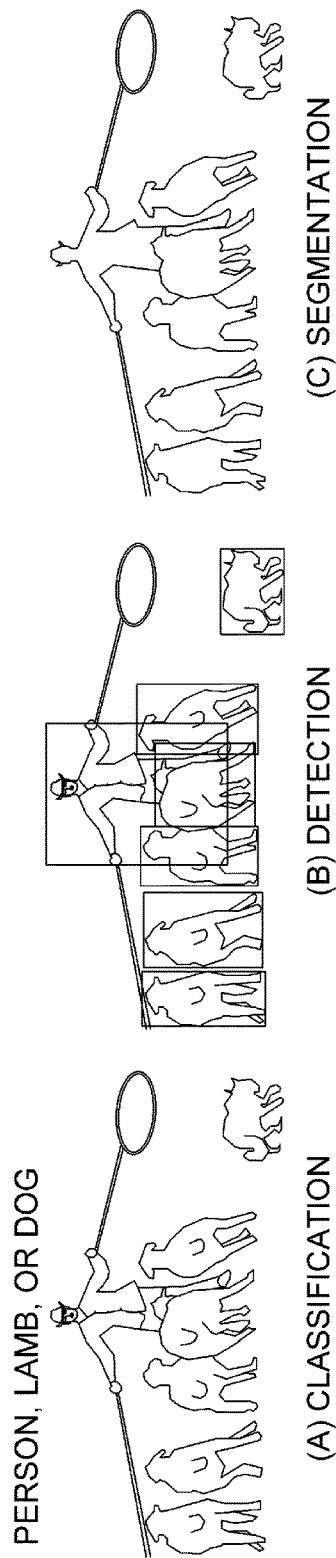
FIG. 1 is a drawing schematically illustrating an example of various outputs acquired from a photograph using a conventional CNN.
Figure 2:
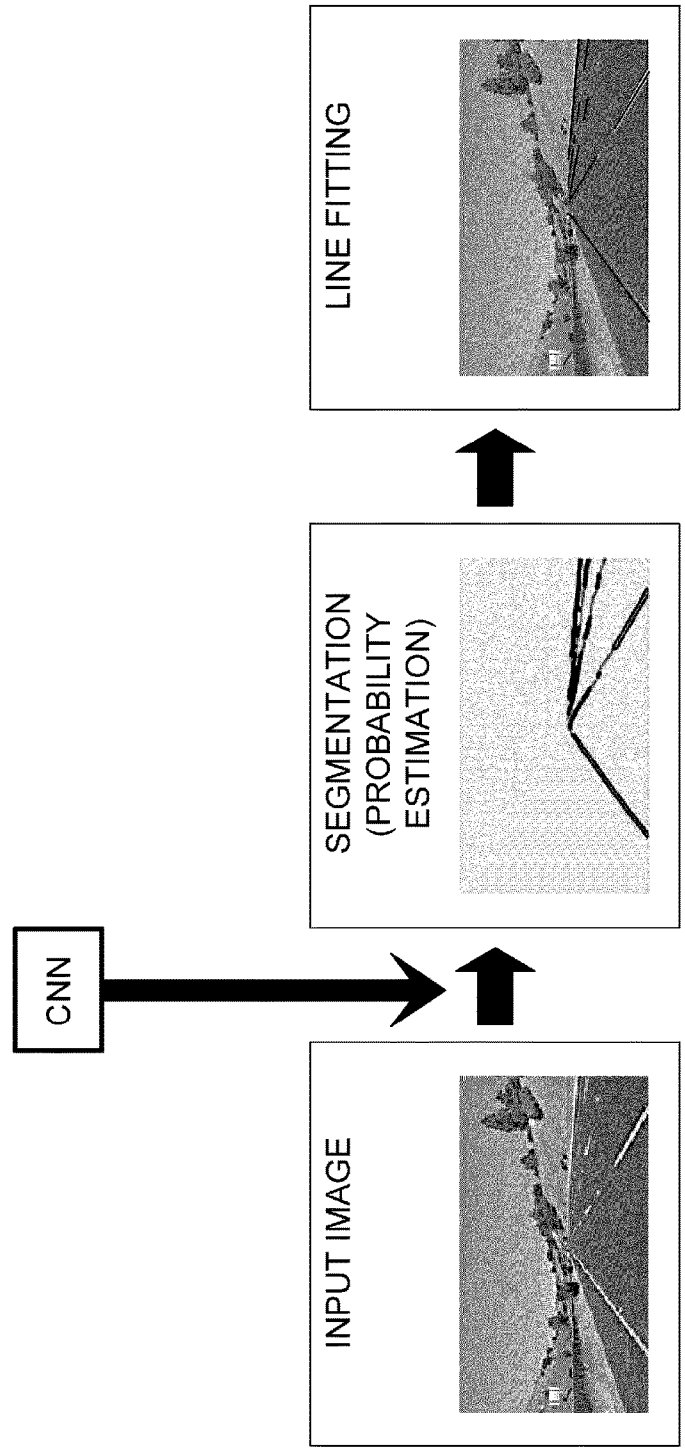
FIG. 2 is a drawing schematically illustrating a conventional lane detection method using the conventional CNN.
Figure 3:
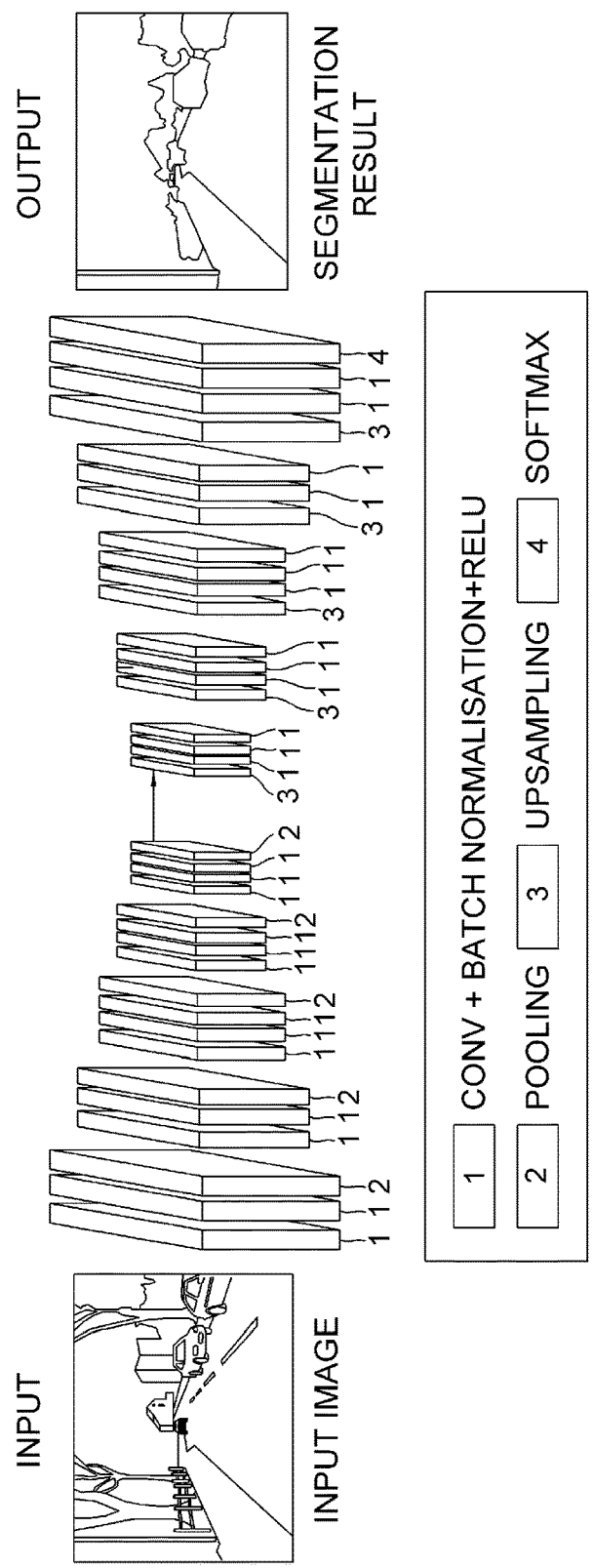
FIG. 3 is a drawing schematically illustrating a conventional process of a general segmentation by using the conventional CNN.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 4:
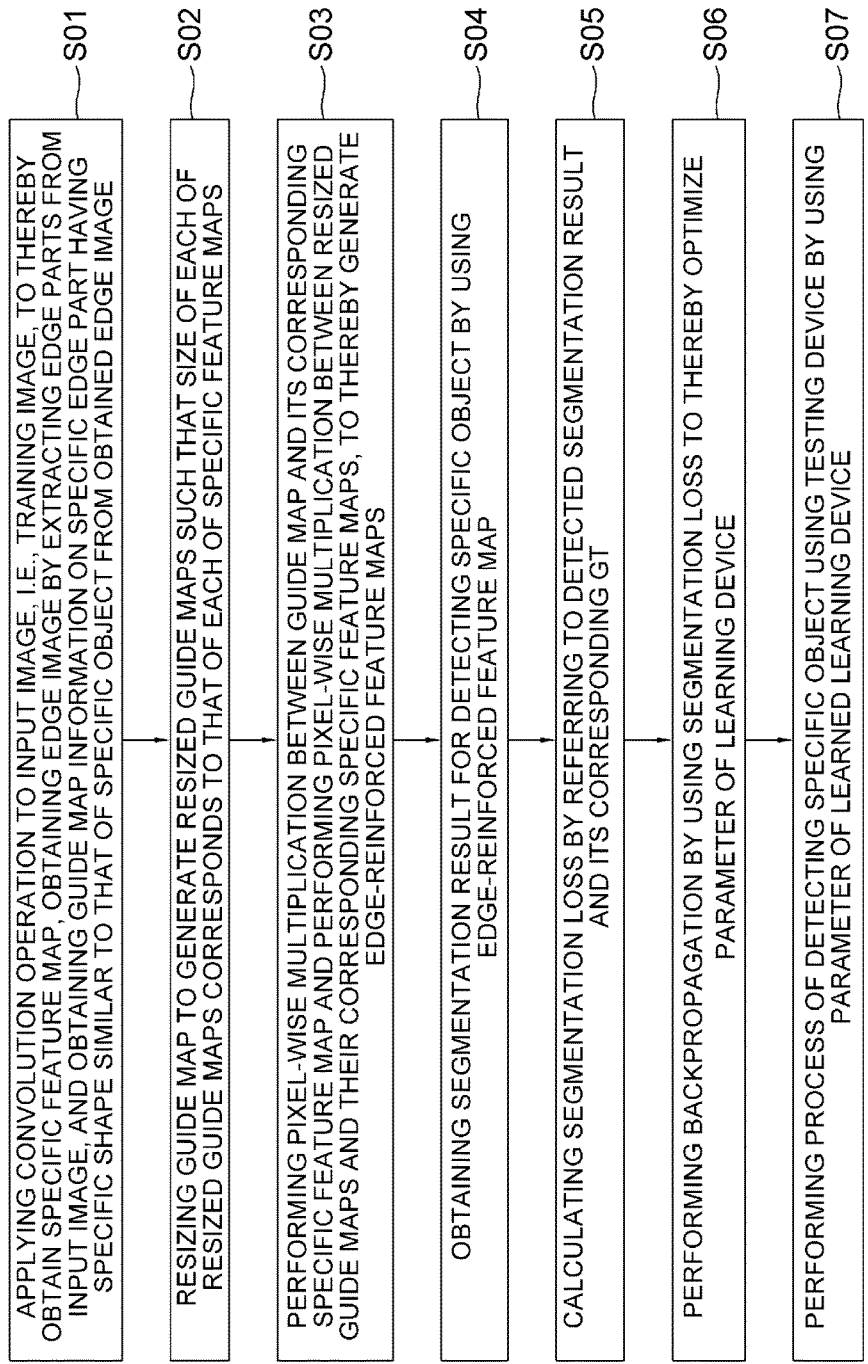
FIG. 4 is a flowchart illustrating a method for detecting an object based on a CNN in accordance with the present invention.

FIG. 4 is a flowchart illustrating a method for detecting an object based on a convolutional neural network (CNN) in accordance with the present invention.

Referring to FIG. 4, a method for detecting a specific object based on CNN in accordance with the present invention includes: applying one or more convolution operations to an input image, i.e., a training image, to thereby obtain at least one specific feature map, obtaining an edge image by extracting at least one edge part from the input image, and obtaining at least one guide map information on at least one specific edge part having a specific shape similar to that of the specific object from the obtained edge image at a step of S01; resizing the guide map to generate one or more resized guide maps such that a size of each of the resized guide maps corresponds to that of each of the specific feature maps at a step of S02; performing a pixel-wise multiplication between the guide map and its corresponding specific feature map and performing a pixel-wise multiplication between the resized guide maps and their corresponding specific feature maps, to thereby generate a plurality of edge-reinforced feature maps at a step of S03; obtaining a segmentation result for detecting the specific object by using the edge-reinforced feature maps at a step of S04; calculating a segmentation loss by referring to the detected segmentation result and its corresponding ground truth (GT) at a step of S05; performing backpropagation by using the segmentation loss to thereby optimize at least one parameter of the learning device at a step of S06; and performing a process of detecting a specific object using a testing device by using at least one parameter of the learned learning device at a step of S07. The above-mentioned steps S01 to S07 will be illustrated in more detail by referring to FIG. 8 but it is not limited thereto.

That is, if only one specific feature map is obtained at the step of S01, only one guide map is also obtained at the step of S01. In this case, a method for detecting a specific object based on CNN in accordance with the present invention includes: performing a process of applying one or more convolution operations to the input image to thereby obtain a specific feature map and a process of obtaining an edge image by extracting at least one edge part from the input image at a step of S10; obtaining a guide map including information on at least one specific edge part having a specific shape similar to that of the specific object from the obtained edge image at a step of S20; and reflecting the guide map on the specific feature map to thereby obtain a segmentation result for detecting the specific object in the input image at a step of S30. The above-mentioned steps S10 to S30 will be illustrated in more detail by referring to FIG. 5.

Figure 5:
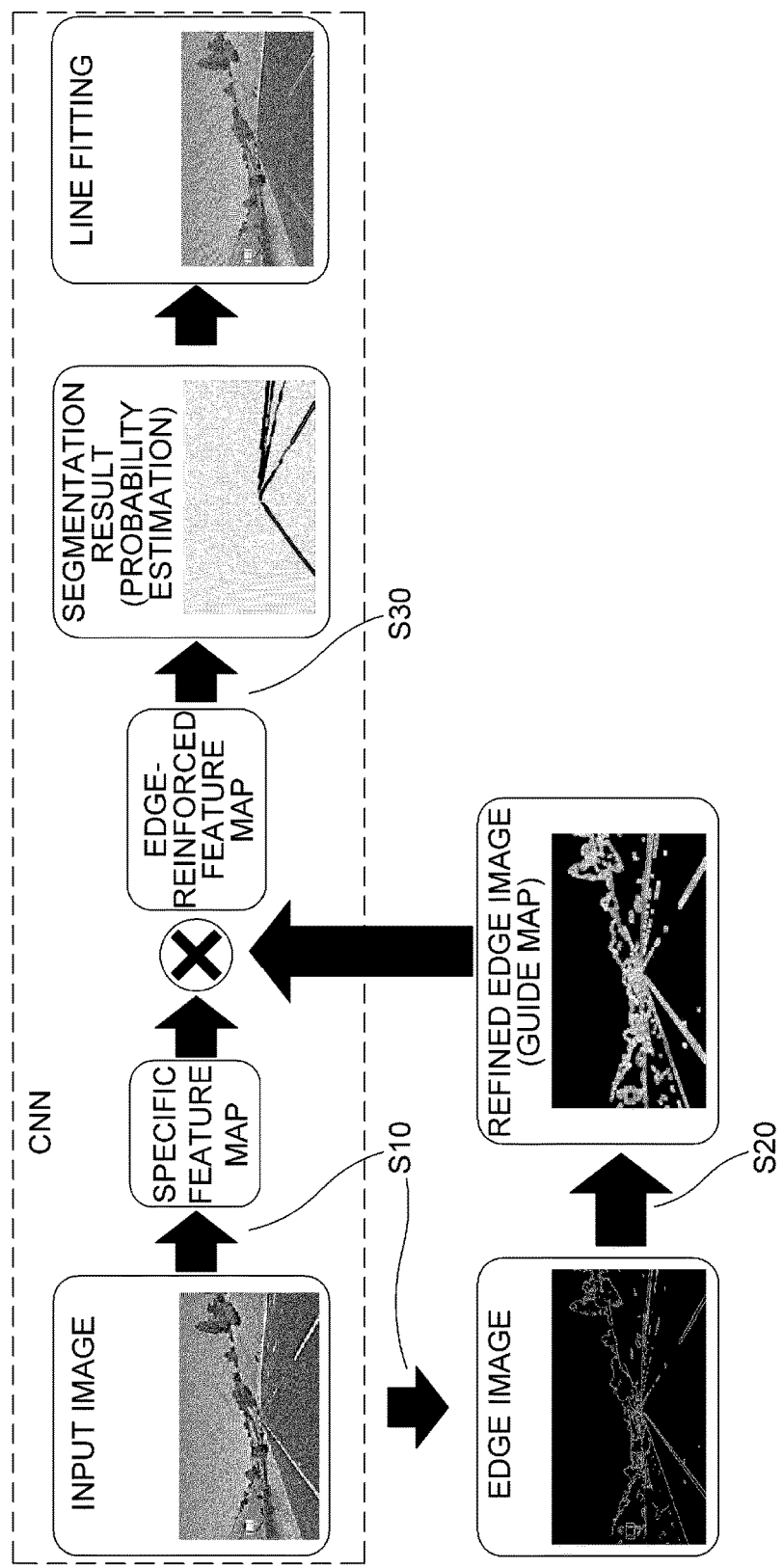
FIG. 5 illustrates a process of detecting an object based on the CNN in accordance one example with the present invention.
Figure 8:
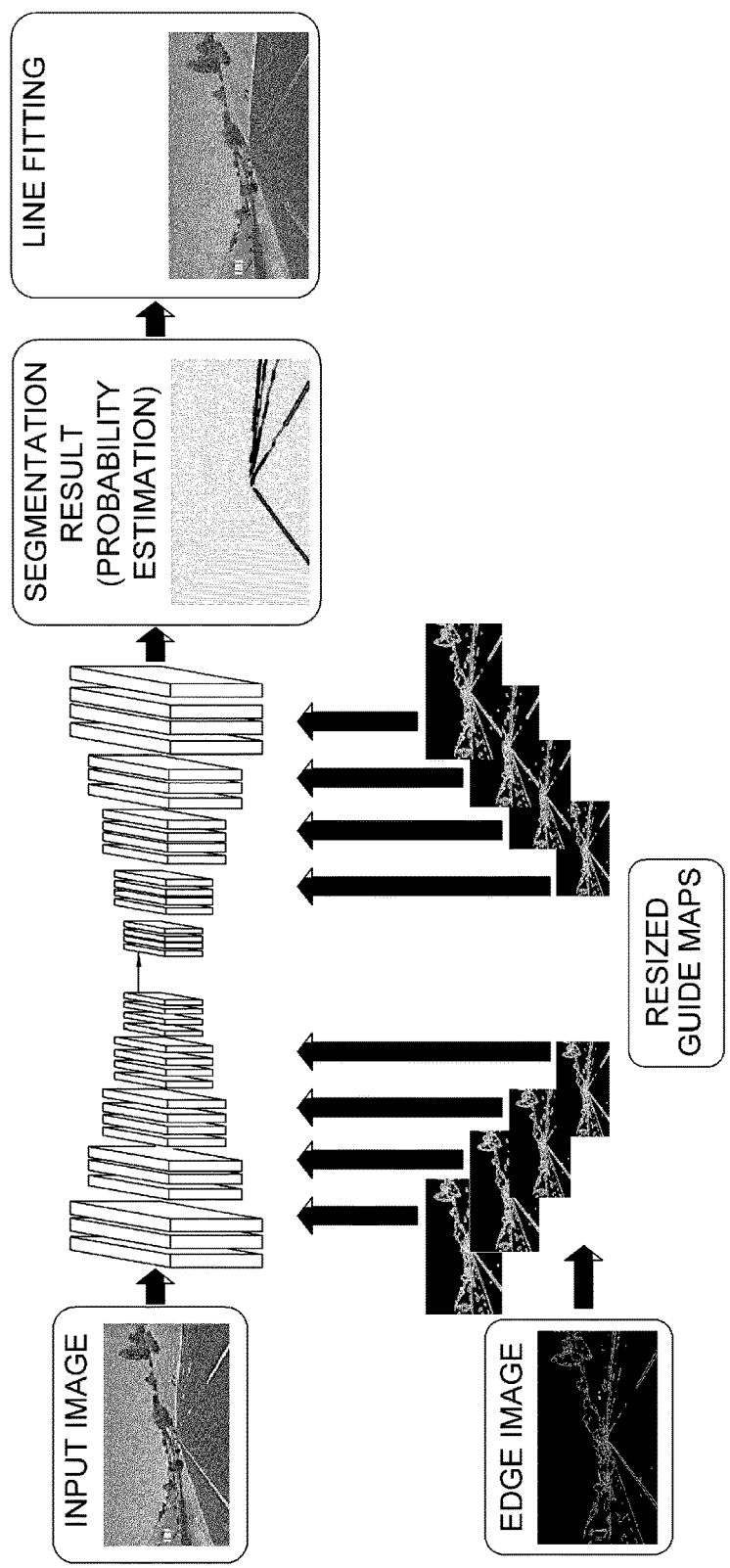
FIG. 8 illustrates a process of detecting an object based on the CNN in accordance with another example embodiment of the present invention.

FIG. 5 illustrates a process of detecting an object based on the CNN in accordance with the present invention, FIG. 6 illustrates an example of a process of generating a guide map, FIG. 7 illustrates another example of a process of generating the guide map, and FIG. 8 illustrates a process of detecting an object based on the CNN in accordance with another example embodiment of the present invention.

Hereinafter, a learning process and a test process for detecting the specific object based on the CNN will be described by referring to FIGS. 4 to 8.

First of all, if an input image is obtained through the learning device, the learning device applies one or more convolution operations and non-linear operations such as ReLU to the input image to thereby obtain at least one specific feature map. The learning device obtains an edge image by extracting at least one edge part from the input image, and obtains at least one guide map including information on a specific edge part having a specific shape similar to that of the specific object from the obtained edge image. Herein, the edge image may generated from the input image through the encoding layer in the learning device, but may also be generated from an input image in a separate device other than the learning device.

Herein, the edge image may be obtained by removing frequency components equal to or less than a specific threshold from the input image. Furthermore, the edge image may include edge parts which are detected by using pixels having relatively large gradients. For example, an edge image may be generated, after calculating gradients of pixels of the input image, by extracting at least one pixel having a gradient equal to or greater than a predetermined threshold among the pixels of the input image. Herein, the generated edge image becomes a canny edge image.

Thereafter, a refined edge image (hereinafter, referred to as "guide map") is generated by processing the edge image such that object parts desired to be detected are clearly displayed. In an embodiment, the guide map is generated by widening the edge part in the edge image. In another embodiment, the guide map may be generated by removing parts other than parts having a shape similar to that of the specific object from the edge image.

Referring to FIG. 6, the guide map may be generated by widening the edge part by applying at least one dilation or morphological operation to the edge image.

Referring to FIG. 7, in another embodiment, when detecting one or more lanes, the guide map is generated by removing edge parts having a shape of a tree from the edge image and retaining edge parts having a shape similar to that of one of the lanes in the edge image. Herein, a relatively large weight is given to the specific shape similar to that of one of the lanes, and a relatively small weight is given to at least one shape other than the specific shape similar to that of the specific object. In another embodiment, the guide map is generated by applying a straight line algorithm or a curved line algorithm to the edge image and giving a large weight to a shape similar to one of the lanes when detecting the lanes. Herein, it is possible to remove all the edge parts having the shape other than the specific shape similar to that of the lane by multiplying 0 and to retain only edge parts having the specific shape similar to that of the lane by multiplying 1. However, since there is a possibility that an actual lane is removed, it would be appropriate to give weights with a value of between 1 and 0, as the case may be.

Thereafter, pixel-wise multiplication between the guide map and the specific feature map is performed to thereby generate an edge-reinforced feature map as shown in FIG. 5.

In accordance with another example embodiment of the present invention, as shown in FIG. 8, a plurality of feature maps of various sizes may be generated from the encoding layer, and a plurality of specific feature maps of various sizes may also be generated from the encoding layer and the decoding layer. Herein, the guide map may be reflected on at least one of the specific feature maps obtained from the encoding layer and the specific feature maps obtained from the decoding layer. To this end, the guide map is resized to generate resized guide maps such that a size of each of the resized guide maps corresponds to that of each of the specific feature maps.

Furthermore, as illustrated in FIG. 8, the pixel-wise multiplication between the guide map and its corresponding specific feature map is performed, and the pixel-wise multiplications between the resized guide maps and their corresponding specific feature maps are performed, to thereby generate a plurality of edge-reinforced feature maps.

In the generated edge-reinforced feature maps, a large weight is given to only the edge parts having the specific shape similar to that of the specific object desired to be detected, and thus the edge parts can be highlighted. In another embodiment, only the edge parts having the specific shape similar to that of the specific object desired to be detected may remain in the edge-reinforced feature maps and the other edge parts may be removed from the edge-reinforced feature maps.

Namely, since the guide map, i.e., the refined edge image, includes only lanes and some background parts or since the guide map has high pixel values for such lanes and some background parts, inference is made except for the parts expressed as black in FIG. 6 or FIG. 7 by performing the pixel-wise multiplication between the guide map and the specific feature map in the form of mask or attention. Namely, it is possible to easily detect lanes through the guide map including parts having a shape close to a lane to which a large weight is given and background parts to which a low weight is given.

Thereafter, additional operations such as deconvolution operation, an operation of FC layer, and an operation of softmax may be applied to the edge-reinforced feature maps to thereby obtain the segmentation result in which the class for the lanes is distinguished from the class for the background in the input image. Then the lanes are detected by using Polynomial fitting algorithm or spline fitting algorithm based on the segmentation result, i.e., by applying the Polynomial fitting algorithm or the spline fitting algorithm to lane candidate pixels to the segmentation result.

Thereafter, the segmentation loss is calculated by referring to the segmentation result and its corresponding ground truth (GT), and the backpropagation is performed by using the segmentation loss to thereby optimize at least one parameter of the learning device.

Then a process of detecting a specific object using a testing device is performed by using at least one parameter of the learned learning device.

Namely, on condition that, (i) the learning device has applied one or more convolution operations to a training image to thereby obtain at least one specific feature map for training; (ii) the learning device has obtained an edge image for training by extracting at least one edge part from the training image, and has obtained at least one guide map including information on a specific edge part having a specific shape similar to that of the specific object from the obtained edge image for training; (iii) the learning device has reflected the guide map for training on the specific feature map for training to thereby obtain a segmentation result for training for detecting the specific object in the training image; (iv) the learning device has calculated a segmentation loss by referring to the detected segmentation result for training and its corresponding ground truth (GT); and (v) the learning device has performed backpropagation by using the segmentation loss to thereby optimize at least one parameter of the learning device, the testing device obtains a test image, Then, the testing device performs (i) a process of applying one or more convolution operations to the test image to thereby obtain at least one specific feature map for testing and (ii) a process of obtaining an edge image for testing by extracting at least one edge part from the test image, and obtaining at least one guide map for testing including information on at least one specific edge part having a specific shape similar to that of the specific object from the obtained edge image for testing.

Thereafter, the testing device reflects the guide map for testing on the specific feature map for testing to thereby obtain a segmentation result for testing for detecting the specific object in the test image.

The present invention has an effect of easily detecting the lanes or the specific objects through the guide map which is generated by extracting the edge image and then processing the edge image such that only parts corresponding to the lanes or the specific objects are remained or a high weight is given to such parts. Namely, the amount of operations of the specific feature map may be significantly reduced by reflecting the edge-reinforced guide map on the specific feature map, and the specific objects or the lanes can be effectively detected by removing the background parts in advance.

The present invention has another effect of clearly detecting only lanes by removing the background parts from the specific feature map through the guide map.

It would be understood by one of ordinary skill in the art that a transmission and/or a reception of the above-described images, i.e., image data such as the training image and the test image, can be performed by a communication unit of the learning device and the testing device, and the processes of the convolutional operation, the deconvolutional operation and the loss value operation can be mainly performed by the processor of the learning device and the testing device, but the present invention is not limited to these examples.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A learning method for detecting a specific object based on convolutional neural network (CNN), comprising steps of:
    (a) a learning device, if an input image is obtained, performing (i) a process of applying one or more convolution operations to the input image to thereby obtain at least one specific feature map and (ii) a process of obtaining an edge image by extracting at least one edge part from the input image, and obtaining at least one guide map including information on at least one specific edge part having a specific shape similar to that of the specific object from the obtained edge image; and
    (b) the learning device reflecting the guide map on the specific feature map to thereby obtain a segmentation result for detecting the specific object in the input image, wherein
    the specific object is at least one lane on a road.

2. The learning method of claim 1, wherein the edge image is obtained by removing frequency components equal to or less than a specific threshold from the input image.

3. The learning method of claim 1, wherein the edge image is a canny edge image which is generated, after calculating gradients of pixels of the input image, by extracting at least one pixel having a gradient equal to or greater than a predetermined threshold among the pixels of the input image.

4. The learning method of claim 1, wherein the guide map is obtained by giving a first weight to the specific shape similar to that of the specific object and giving a second weight to at least one shape other than the specific shape similar to that of the specific object, and
    wherein the first weight is greater than the second weight.

5. The learning method of claim 1, wherein the guide map is generated by widening the specific edge part by applying at least one dilation or morphological operation to the edge image.

6. The learning method of claim 1, wherein, at the step of (b), the learning device performs pixel-wise multiplication between the guide map and the specific feature map to thereby generate at least one edge-reinforced feature map.

7. The learning method of claim 6, wherein the step of (b) includes steps of:
    (b1) the learning device, on condition that there are a plurality of the specific feature maps, resizing the guide map to generate one or more resized guide maps such that a size of each of the resized guide maps corresponds to that of each of the specific feature maps; and
    (b2) the learning device performing the pixel-wise multiplication between the guide map and its corresponding specific feature map and performing the pixel-wise multiplication between the resized guide maps and their corresponding specific feature maps, to thereby generate the plurality of edge-reinforced feature maps.

8. The learning method of claim 1, wherein, at the step of (b), the specific feature map on which the guide map is reflected is selected among at least one feature map obtained from an encoding layer of the learning device and at least one feature map obtained from a decoding layer of the learning device.

9. The learning method of claim 1, further comprising:
    (c) the learning device calculating a segmentation loss by referring to the segmentation result and its corresponding ground truth (GT); and
    (d) the learning device performing backpropagation by using the segmentation loss to thereby optimize at least one parameter of the learning device.

10. A testing method for detecting at least one specific object included in a convolutional neural network (CNN)-based image, comprising steps of:
    (a) on condition that, (i) a learning device has applied one or more convolution operations to a training image to thereby obtain at least one specific feature map for training; (ii) the learning device has obtained an edge image for training by extracting at least one edge part from the training image, and has obtained at least one guide map for training including information on a specific edge part for training having a specific shape similar to that of the specific object from the obtained edge image for training; (iii) the learning device has reflected the guide map for training on the specific feature map for training to thereby obtain a segmentation result for training for detecting the specific object in the training image; (iv) the learning device has calculated a segmentation loss by referring to the detected segmentation result for training and its corresponding ground truth (GT); and (v) the learning device has performed backpropagation by using the segmentation loss to thereby optimize at least one parameter of the learning device, a testing device obtaining a test image;
    (b) the testing device performing (i) a process of applying one or more convolution operations to the test image to thereby obtain at least one specific feature map for testing and (ii) a process of obtaining an edge image for testing by extracting at least one edge part from the test image, and obtaining at least one guide map for testing including information on at least one specific edge part for testing having a specific shape similar to that of the specific object from the obtained edge image for testing; and
    (c) the testing device reflecting the guide map for testing on the specific feature map for testing to thereby obtain a segmentation result for testing for detecting the specific object in the test image, wherein
    the specific object is at least one lane on a road.

11. The testing method of claim 10, wherein the edge image for testing is obtained by removing frequency components equal to or less than a specific threshold from the test image.

12. The testing method of claim 10, wherein the edge image for testing is a canny edge image which is generated, after calculating gradients of pixels of the test image, by extracting at least one pixel having a gradient equal to or greater than a predetermined threshold among the pixels of the test image.

13. The testing method of claim 10, wherein the guide map for testing is obtained by giving a first weight to the specific shape similar to that of the specific object and giving a second weight to at least one shape other than the specific shape similar to that of the specific object,
wherein the first weight is greater than the second weight, and
wherein the guide map for testing is generated by widening the specific edge part for testing by applying at least one dilation or morphological operation to the edge image for testing.

14. The testing method of claim 10, wherein the step of (c) includes steps of:
(c1) the testing device, on condition that there are a plurality of the specific feature maps for testing, resizing the guide map for testing to generate one or more resized guide maps for testing such that a size of each of the resized guide maps for testing corresponds to that of each of the specific feature maps for testing; and
(c2) the testing device performing the pixel-wise multiplication between the guide map for testing and its corresponding specific feature map for testing and performing the pixel-wise multiplication between the resized guide maps for testing and their corresponding specific feature maps for testing, to thereby generate the plurality of edge-reinforced feature maps for testing.

15. A learning device for detecting a specific object based on convolutional neural network (CNN), comprising:
a processor configured to perform on an input image, which is used as training image, processes of (I) applying one or more convolution operations to the input image to thereby obtain at least one specific feature map; (II) obtaining an edge image by extracting at least one edge part from the input image, and obtaining at least one guide map including information on at least one specific edge part having a specific shape similar to that of the specific object from the obtained edge image; and (III) reflecting the guide map on the specific feature map to thereby obtain a segmentation result for detecting the specific object in the input image, wherein
the specific object is at least one lane on a road.

16. The learning device of claim 15, wherein the edge image is obtained by removing frequency components equal to or less than a specific threshold from the input image.

17. The learning device of claim 15, wherein the edge image is a canny edge image which is generated, after calculating gradients of pixels of the input image, by extracting at least one pixel having a gradient equal to or greater than a predetermined threshold among the pixels of the input image.

18. The learning device of claim 15, wherein the guide map is obtained by giving a first weight to the specific shape similar to that of the specific object and giving a second weight to at least one shape other than the specific shape similar to that of the specific object, and
wherein the first weight is greater than the second weight.

19. The learning device of claim 15, wherein the guide map is generated by widening the specific edge part by applying at least one dilation or morphological operation to the edge image.

20. The learning device of claim 15, wherein, at the process of (III), the processor performs pixel-wise multiplication between the guide map and the specific feature map to thereby generate at least one edge-reinforced feature map.

21. The learning device of claim 20, wherein the process of (III) includes processes of:
(III-1) on condition that there are a plurality of the specific feature maps, resizing the guide map to generate one or more resized guide maps such that a size of each of the resized guide maps corresponds to that of each of the specific feature maps; and
(III-2) performing the pixel-wise multiplication between the guide map and its corresponding specific feature map and performing the pixel-wise multiplication between the resized guide maps and their corresponding specific feature maps, to thereby generate the plurality of edge-reinforced feature maps.

22. The learning device of claim 15, wherein, at the process of (III), the specific feature map on which the guide map is reflected is selected among at least one feature map obtained from an encoding layer thereof and at least one feature map obtained from a decoding layer thereof.

23. The learning device of claim 15, wherein the processor further performs processes of:
(IV) calculating a segmentation loss by referring to the segmentation result and its corresponding ground truth (GT); and
(V) performing backpropagation by using the segmentation loss to thereby optimize at least one parameter thereof.

24. A testing device for detecting at least one specific object included in a convolutional neural network (CNN)-based image, comprising:
a processor configured to perform on a test image after (i) a learning device has applied one or more convolution operations to a training image to thereby obtain at least one specific feature map for training; (ii) the learning device has obtained an edge image for training by extracting at least one edge part from the training image, and has obtained at least one guide map for training including information on a specific edge part for training having a specific shape similar to that of a specific object from the obtained edge image for training; (iii) the learning device has reflected the guide map for training on the specific feature map for training to thereby obtain a segmentation result for training for detecting the specific object in the training image; (iv) the learning device has calculated a segmentation loss by referring to the detected segmentation result for training and its corresponding ground truth (GT); and (v) the learning device has performed backpropagation by using the segmentation loss to thereby optimize at least one parameter of the learning device; wherein
the processor is further configured to perform processes of (I) applying one or more convolution operations to the test image to thereby obtain at least one specific feature map for testing, and obtaining an edge image for testing by extracting at least one edge part from the test image, and obtaining at least one guide map for testing including information on at least one specific edge part for testing having a specific shape similar to that of the specific object from the obtained edge image for testing; and (II) reflecting the guide map for testing on the specific feature map for testing to thereby obtain a segmentation result for testing for detecting the specific object in the test image, wherein the specific object is at least one lane on a road.

25. The testing device of claim 24, wherein the edge image for testing is obtained by removing frequency components equal to or less than a specific threshold from the test image.

26. The testing device of claim 24, wherein the edge image for testing is a canny edge image which is generated, after calculating gradients of pixels of the test image, by extracting at least one pixel having a gradient equal to or greater than a predetermined threshold among the pixels of the test image.

27. The testing device of claim 24, wherein the guide map for testing is obtained by giving a first weight to the specific shape similar to that of the specific object and giving a second weight to at least one shape other than the specific shape similar to that of the specific object, wherein the first weight is greater than the second weight, and wherein the guide map for testing is generated by widening the specific edge part for testing by applying at least one dilation or morphological operation to the edge image for testing.

28. The testing device of claim 24, wherein the process of (II) includes processes of:

(II_1) on condition that there are a plurality of the specific feature maps for testing, resizing the guide map for testing to generate one or more resized guide maps for testing such that a size of each of the resized guide maps for testing corresponds to that of each of the specific feature maps for testing; and (II_2) performing the pixel-wise multiplication between the guide map for testing and its corresponding specific feature map for testing and performing the pixel-wise multiplication between the resized guide maps for testing and their corresponding specific feature maps for testing, to thereby generate the plurality of edge-reinforced feature maps for testing.

* * * * *